US009448805B2

United States Patent
Qadri et al.

(10) Patent No.: US 9,448,805 B2
(45) Date of Patent: Sep. 20, 2016

(54) SOFTWARE CONTROLLED DATA PREFETCH BUFFERING

(71) Applicant: COMSATS Institute of Information Technology, Islamabad (PK)

(72) Inventors: Muhammad Yasir Qadri, Wah Cantt (PK); Nadia Nawaz Qadri, Wah Cantt (PK); Klaus Dieter McDonald-Maier, Harwich (GB)

(73) Assignee: COMSATS Institute of Information Technology, Islamabad (PK)

( * ) Notice: Subject to any disclaimer, the term of this patent is extended or adjusted under 35 U.S.C. 154(b) by 411 days.

(21) Appl. No.: 13/918,407

(22) Filed: Jun. 14, 2013

(65) Prior Publication Data

US 2014/0372730 A1 Dec. 18, 2014

(51) Int. Cl.
*G06F 9/04* (2006.01)
*G06F 9/38* (2006.01)

(52) U.S. Cl.
CPC .............. *G06F 9/3814* (2013.01); *G06F 9/383* (2013.01)

(58) Field of Classification Search
CPC ........................................................ G06F 9/31
See application file for complete search history.

(56) References Cited

U.S. PATENT DOCUMENTS 7,461,205 B2 * 12/2008 O'Brien .............. G06F 9/30047
711/118
2002/0073301 A1 * 6/2002 Kahle .................... G06F 9/3804
712/235

OTHER PUBLICATIONS

Non-Final Office Action issued Oct. 26, 2015, in U.S. Appl. No. 13/918,431.
Final Office Action issued Feb. 16, 2016, in U.S. Appl. No. 13/918,431.
Non-Final Office Action issued May 16, 2016, in U.S. Appl. No. 13/918,431.

* cited by examiner

*Primary Examiner* — Cheng-Yuan Tseng
(74) *Attorney, Agent, or Firm* — H.C. Park & Associates, PLC

(57) ABSTRACT

The invention relates to the method of prefetching data in micro-processor buffer under software controls.

4 Claims, 2 Drawing Sheets

SOFTWARE CONTROLLED DATA PREFETCH BUFFERING

BACKGROUND OF THE INVENTION

This invention relates to the method of prefetching data in micro-processor buffer under software control.

BRIEF SUMMARY OF THE INVENTION

Cache memories have been widely used in microprocessors and microcontrollers (now on referred to as processor) for faster data transfer between the processor and main memory. Low end processors however do not employ cache for mainly two reasons. 1) The overhead of cache implementation in terms of energy and area is greater, and 2) as the cache performance primarily depends on number of hits, increasing data miss could cause processor to remain in stall mode for longer durations which in turn makes cache to become a liability than an advantage. Based on the facts discussed above a method of buffering data using software based prefetching is proposed which with minimum logic and power overhead could be employed in low-end processors for improving throughput. A preliminary search of the prior work in this field did not disclose any patents directly related to this invention but the following could be considered related:

U.S. Pat. No. 5,838,945: In which instruction and data prefetch method is described, where a prefetch instruction can control cache prefetching.

U.S. Pat. No. 4,713,755: In which a method of cache memory consistency control using software instructions is claimed.

U.S. Pat. No. 5,784,711: In which a method of data cache prefetching under the control of instruction cache is claimed.

U.S. Pat. No. 4,714,994: In which a method to control the instruction prefetch buffer array is claimed. The buffer could store the code for a number of instructions that have already been executed and those which are yet to be executed.

U.S. Pat. No. 4,775,927: In which a method and apparatus that enables an instruction prefetch buffer to distinguish between old prefetches that occurred before a branch and new prefetches which occurred after the branch in an instruction stream is claimed.

DETAILED DESCRIPTION OF THE INVENTION

Figure 1:
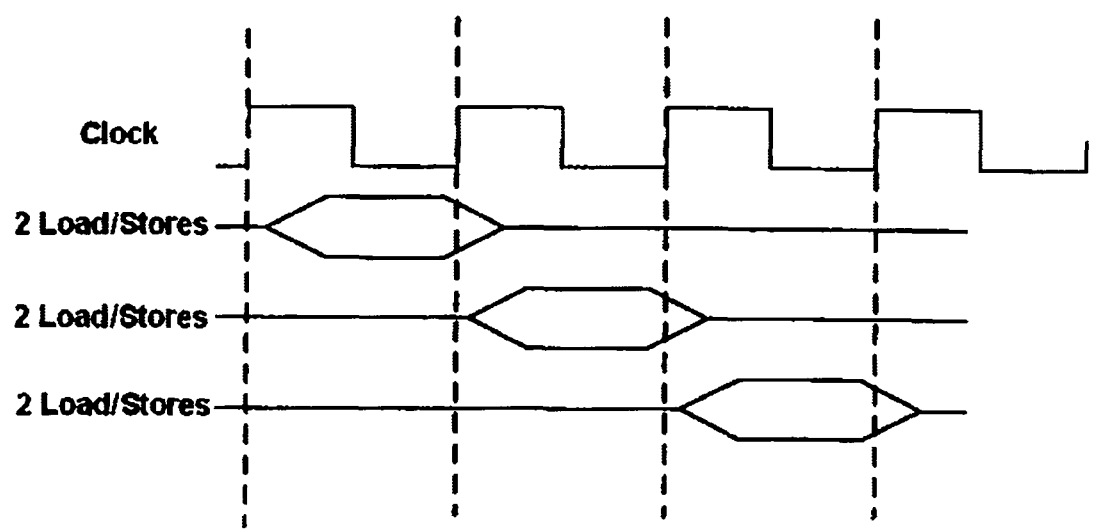
FIG. 1 depicts the timing diagram of Data Buffer Operation
Figure 2:
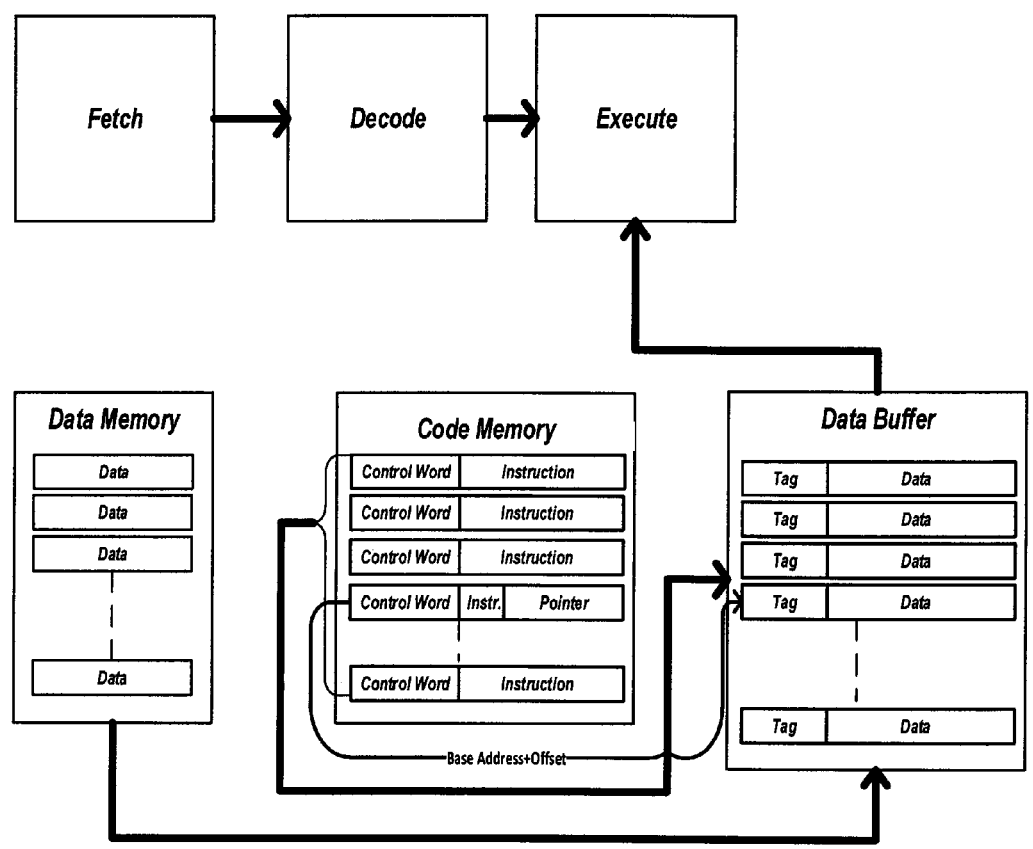
FIG. 2 depicts the Data Buffer Architecture

The major difference between the proposed buffer and typical cache systems is its control that is completely done by software. During software design phase or code compilation, control words specifying exact location of the data are placed at the location one instruction ahead, so that during execution the data required in the next cycle could be fetched seamlessly.

Essential Features of the invention are a processor with cycle time greater than or equal to that of the associated data memory (i.e. time to perform a memory read or memory write). Whereas for the instruction memory the memory read cycle time (only) should be less than or equal to that of the processor.

A data memory capable of providing access to at least two locations in one cycle.

Addition of special control words (or instructions) before each instruction of the user code to help the system know in advance which data is to fetch next.

Important (but not Essential) Features include a software tool or compiler to automatically generate and insert the control words to the code and a software tool or an extension of the tool mentioned above; to keep track of available data buffer space and insert control words to replace data not needed.

The data buffer space is to contain multiple data buffers and is to have tags associated with each location. The operation of the Data Buffer is illustrated in FIGS. 3 and 4. Taking the advantage of multiport memory, a pair of data can be fetched in every machine cycle based on the preceding control words. If a branch instruction occurs then two locations could be fetched i.e. one for true and other for false simultaneously.

The Data Buffer has to have address tags of the fetched data but could be much smaller than a typical cache as the data fetching is highly targeted and no extra data other than the required one is fetched. This architecture is also helpful in reducing the address computation time in case of indexed or pointer based operations. The data replacement would be determined by the control words in advance as per requirement and availability of storage space.

What is claimed is:

1. A method to prefetch data from a memory to a buffer comprising:
    a processor;
    a storage array placed between the memory and the processor; and
    a compiler to insert a control word to a user code,
    wherein the storage array comprises multiple storage locations having tags associated with each location, and
    wherein the control word, indicating the location of data required by a next instruction, is inserted to the user code and used to assist the buffer to prefetch the data required by the next instruction,
    wherein the control words are inserted at least one instruction before the next instruction that requires additional cycles to compute location of the data to be fetched, and
    wherein the next instruction is one of a data load and a data store instruction that requires computation of location before at least one of a data store and a data fetch operation.

2. The method of claim 1, wherein the next instruction comprises pointer based operations.

3. The method of claim 2, wherein the pointer based operations comprise at least one of pre-increment, post-decrement, and indirect load and indirect store with fixed displacement, or any combination thereof.

4. The method of claim 3, wherein the buffer prefetches the data needed by the next instruction to be executed to a pipeline based on the instruction in execution comprising the control word indicating the address for the data to be fetched.

* * * * *

UNITED STATES PATENT AND TRADEMARK OFFICE
CERTIFICATE OF CORRECTION

PATENT NO.        : 9,448,805 B2
APPLICATION NO.   : 13/918407
DATED             : September 20, 2016
INVENTOR(S)       : Muhammad Yasir Qadri et al.

It is certified that error appears in the above-identified patent and that said Letters Patent is hereby corrected as shown below:

On the Title Page

In Line 2 of item (73), the Assignee's city "Islamabad" should be changed to --WAH--.

Signed and Sealed this
Tenth Day of April, 2018

Andrei Iancu
*Director of the United States Patent and Trademark Office*